United States Patent

Garban et al.

[11] Patent Number: 5,824,956
[45] Date of Patent: Oct. 20, 1998

[54] CONNECTION ACCESSORY FOR LOW VOLTAGE POWER CABLES

[75] Inventors: Béatrice Jeanne Marie Claude Garban, Paris; Daniel Hubert Marie Dupays, La Bresse, both of France

[73] Assignee: Cables Pirelli, France

[21] Appl. No.: 935,798

[22] Filed: Sep. 23, 1997

Related U.S. Application Data

[63] Continuation of Ser. No. 507,806, Jul. 26, 1995.

[30] Foreign Application Priority Data

Jul. 29, 1994 [FR] France .................................. 94 09422

[51] Int. Cl.$^6$ ................................................. H02G 15/08
[52] U.S. Cl. ........................................... 174/93; 174/77 R
[58] Field of Search .............................. 174/73.1, 74 A, 174/76, 77 R, 91, 92, 93

[56] References Cited

U.S. PATENT DOCUMENTS

| | | | |
|---|---|---|---|
| 3,836,694 | 9/1974 | Kapell .................................. | 174/93 X |
| 4,736,072 | 4/1988 | Hvidsten .................................. | 174/93 |
| 4,769,513 | 9/1988 | Ragland et al. .................. | 174/23 R X |
| 4,885,432 | 12/1989 | Amoyal et al. ........................... | 174/92 |

FOREIGN PATENT DOCUMENTS

| | | | |
|---|---|---|---|
| 0219071 | 10/1986 | European Pat. Off. ....... | H02G 15/18 |
| 0542010A3 | 10/1992 | European Pat. Off. ................ | 174/92 |
| 2278183 | 6/1976 | France ........................... | H02G 15/18 |
| 2332637 | 11/1976 | France ........................... | H02G 15/10 |
| WO 9005401 | 11/1989 | WIPO ..................................... | 174/93 |
| WO 9217928 | 4/1992 | WIPO ........................... | H02G 15/18 |

OTHER PUBLICATIONS

"New Riverside University Dictionary" 1994.

*Primary Examiner*—Kristine L. Kincaid
*Assistant Examiner*—Chau N. Nguyen
*Attorney, Agent, or Firm*—Brooks Haidt Haffner & Delahunty

[57] ABSTRACT

An accessory for enclosing the connection area between low voltage power cables has a pair of rigid end flanges for disposition over the adjacent insulated portions of the cables with an elastic wrap around corrugated elastomeric flap intermediate portion between the end flanges for tightly enwrapping the cable connection area. The cables are passed through housing parts or ports in the end flanges, the connections are made, and the wrap around flap is tightly drawn about the connection, making a sealing union with the flanges. Longitudinal edges of the flap are joined and clamped together.

8 Claims, 3 Drawing Sheets

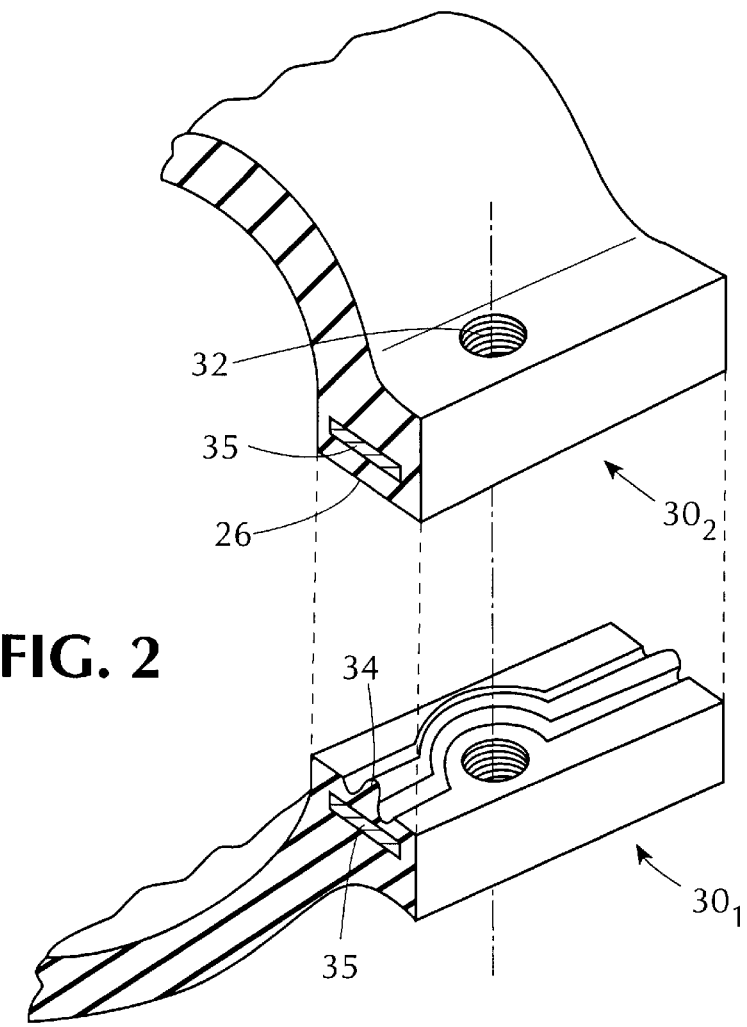
FIG. 2
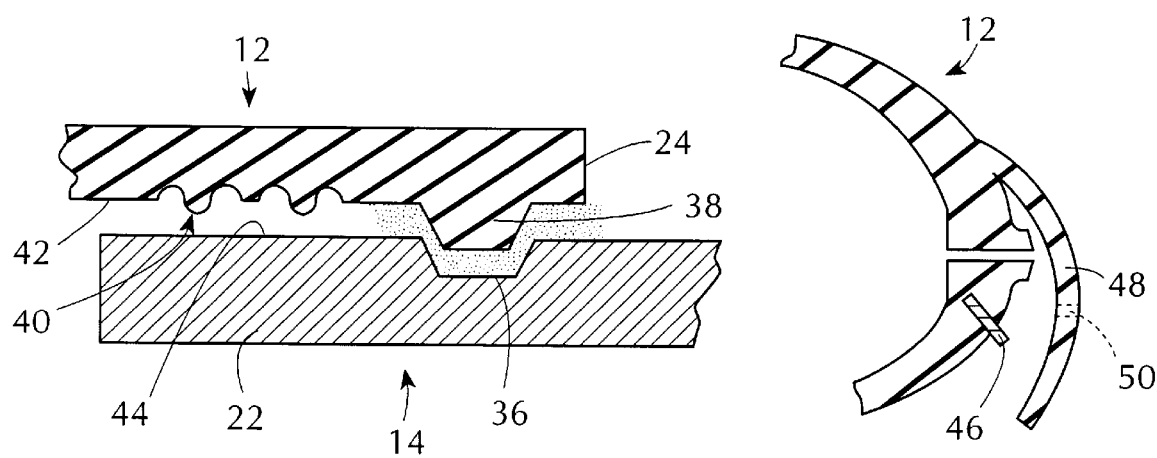
FIG. 3
FIG. 4

CONNECTION ACCESSORY FOR LOW VOLTAGE POWER CABLES

This application is a continuation of application Ser. No. 08/507,806, filed Jul. 26, 1995.

BACKGROUND OF THE INVENTION

1. Field of the Invention

The invention relates to the technical field of low voltage power cables and, more especially, to their connection.

2. Description of the Prior Art

The generic term 'connection' refers, in particular, to the joining of two cables, or the connection of a branch cable to a main cable, that is to say a single branch connection, or again, the connection of two branch cables to a main cable, that is to say a double branch connection.

Connection itself consists firstly in baring the individual leads of the different cables in question and then in connecting them according to the nature of the operation. Once the connections have been effected, a rigid housing is installed, and then filled with an insulating material which is cast or injected in situ, this generally being an epoxy or polyurethane type resin. Apart from the fact that such a filling lengthens the connection operation, there are a number of drawbacks which are inherent in the very nature of the filling material.

This material cannot, in fact, be stored indefinitely since it would lose its requisite properties.

In addition, it can be a positive risk, not only to the installer but also to the environment.

Another solution is to effect a series of taping operations about the connection area.

However, such a system also necessitates the injection of a filling material.

A further solution is to shrink a heat shrinkable sheath around the connection area. However, as a flame has to be used, this is a delicate, and even dangerous, operation for the installer.

SUMMARY OF THE INVENTION

To overcome these drawbacks, the invention proposes an accessory permitting simple, durable connection without the use of a flame, while at the same time dispensing with the use of a filling material.

For this purpose, the invention proposes an accessory for the cold connection of low voltage cables, disposed about a connection area comprising two lateral areas in which the cables are sheathed, and an intermediate physical interconnection area, characterized in that it includes:

- a pair of rigid flanges disposed in the region of each lateral area and each provided with at least a housing permitting the passage of a corresponding number of sheathed cables;
- a tight elastic envelope covering the intermediate area and sealingly fixed at its two lateral ends to each of the flanges.

The accessory according to the invention enables the aforementioned objects to be achieved. It ensures, in fact perfectly tight, durable cold connection.

What is more, thanks to the use of a tight envelope, the accessory does not necessitate the use of a filling material.

Its elasticity ensures, on one hand, optimum mating of the envelope with the contours of the cables and their physical interconnections, which limits the overall volume of the accessory. Furthermore, the elasticity of the envelope makes the accessory very easy to position, so that it is not necessary to displace the cables in order to install the envelope, which is not the case with a rigid housing.

Finally, thanks to the invention, a full range of accessories is obtained from a limited number of components, since flanges and envelopes of different sizes are interchangeable.

BRIEF DESCRIPTION OF THE DRAWINGS

Further advantages and features of the invention will emerge from a study of the following description of the different forms of embodiment, with reference to the annexed drawings, wherein:

FIG. 2 is an enlarged perspective view showing a variant of the closure of the envelope;

FIG. 3 is a schematic view illustrating the interface between the flange and the envelope;

FIG. 4 is a cross-sectional schematic view showing the system for positioning the envelope;

DETAILED DESCRIPTION OF THE PREFERRED EMBODIMENTS

Figure 1:
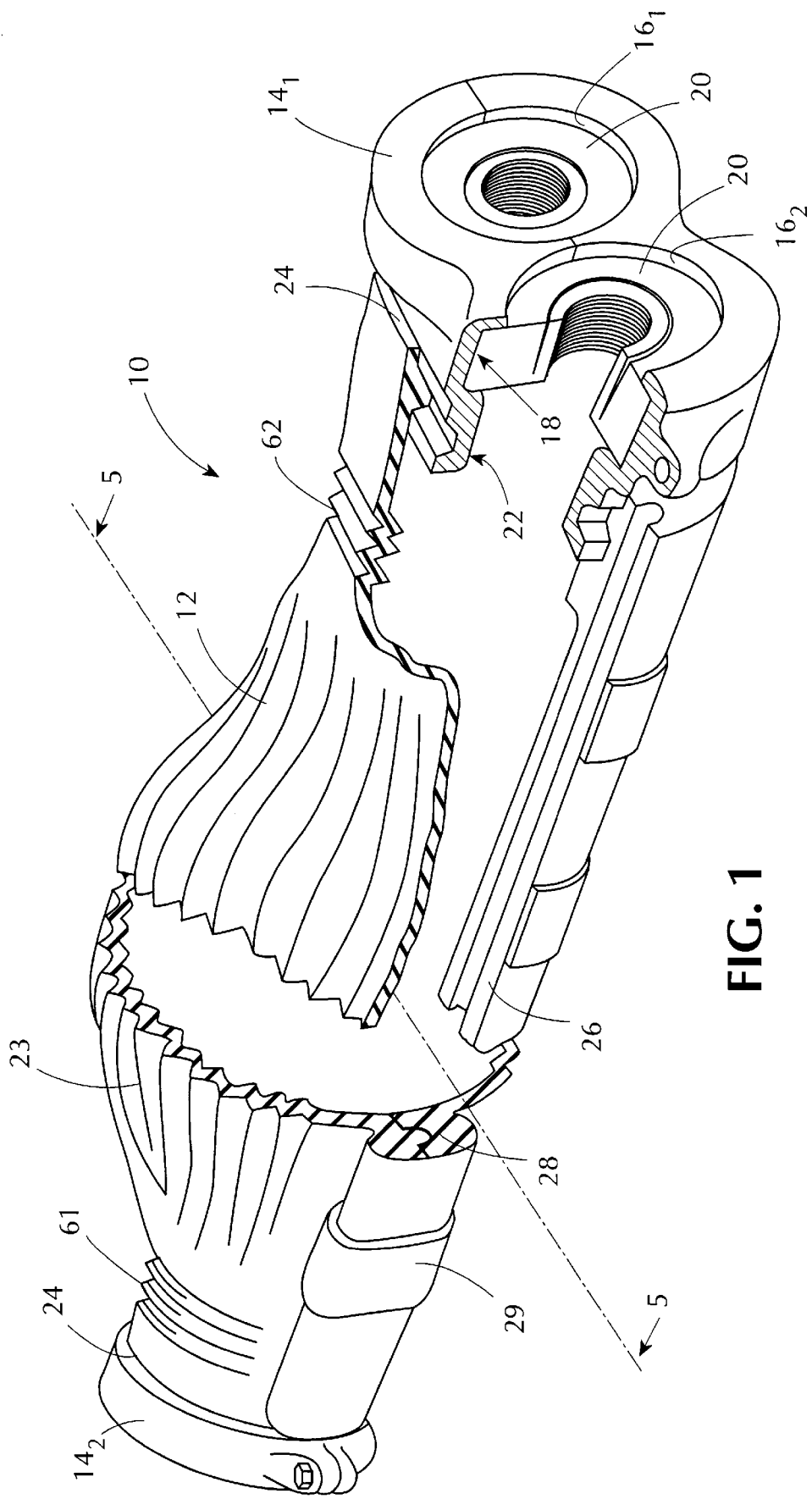
FIG. 1 is a perspective schematic view, with certain portions stripped away, of a connection accessory according to the invention.

FIG. 1 shows a low voltage cable connection accessory, generally designated by reference numeral 10.

This accessory permits the connection of a branch cable to a main cable. However, a junction or double branch connection accessory could also be contemplated without departing from the scope of the invention.

The accessory is composed of an intermediate envelope 12 and of two lateral flanges $14_1$ and $14_2$ referred to generally as 14. These flanges are formed, for example, by two complementary half pieces and are made of a metallic or a plastic material. The first of these flanges, $14_1$, is intended to fit over one of the ends of the main cable as well as the branch cable. For this purpose, it is provided with two circular housings, $16_1$, $16_2$, permitting the passage of the cables, disposed side by side. These housings have a U-shaped section 18 in which are housed seals 20 of elastomeric material ensuring a tight seal with the outer sheaths of the cables penetrating each housing.

Flange $14_1$ is extended in the direction of the intermediate area, by a flattened portion 22 cooperating with the end of the envelope in order to ensure that their mutual connection is perfectly tight, as will be described below.

Envelope 12 is formed, for example, of a sheet made of an elastomer having a thickness of approximately 6 mm.

In the example given, the envelope is provided with longitudinal folds 23 which, after the fashion of bellows, permit optimum mating with the outer volume of the physical connections and the cables, located between the two flanges.

The envelope can also be provided with transverse folds, 61 and 62, conferring upon it the ability to bend, for example when the two lateral flanges are not parallel.

The sheet forming envelope 12 bends back on itself and is fixed at its two side ends 24 to the respective flattened portions 22 of flanges 14. The closing of the envelope at its two longitudinal ends 26 is ensured by means of a tenon and mortise joint 28 reinforced by means of a clamping means 29.

An envelope closure variant is illustrated in FIG. 2. Two outwardly extending flattened portions, $30_1$ and $30_2$, are provided in the area of the longitudinal ends 26 of envelope 12. These flattened portions are provided with holes 32 permitting the passage of fixing means such as, for example, screws, not shown. The tightness of the closure is enhanced by providing, on one of flattened portions $30_1$, a double grooved joint 34. When the envelope is closed, this joint is crushed against the plane wall of corresponding flat portion $30_2$ and ensures increased tightness.

Two metallic inserts 35 are further intercalated within each flattened portion for the purpose of ensuring their rigidity and improving the crushing of the double grooved joint.

FIG. 3 shows more precisely the fixing of lateral end 24 of envelope 12 to flattened portion 22 of flange 14 ($14_1$ or $14_2$). For this purpose, a groove 36 is provided in flattened portion 22 in order to receive a projection 38 of the envelope, so as to obtain a tenon and mortise joint.

Tightness is ensured by means of at least one grooved joint 40 (two in the example described). These joints are provided in the region of the inner surface 42 of the envelope, opposite the plane outer surface 44 of flange 14. Tightness is enhanced by impregnating the area of contact between the groove and the projections using a sealing product such as putty.

In order to make it easier to position when it is fixed to each flange, the envelope is provided with finger members 46, which are constituted by a metallic insert projecting on one of the longitudinal ends of the envelope (see FIG. 4). Each finger cooperates with a corresponding flexible tab 48 provided on the other longitudinal end of the envelope, and provided with a hole 50 enabling it to be fixed onto the finger member.

Figure 5:
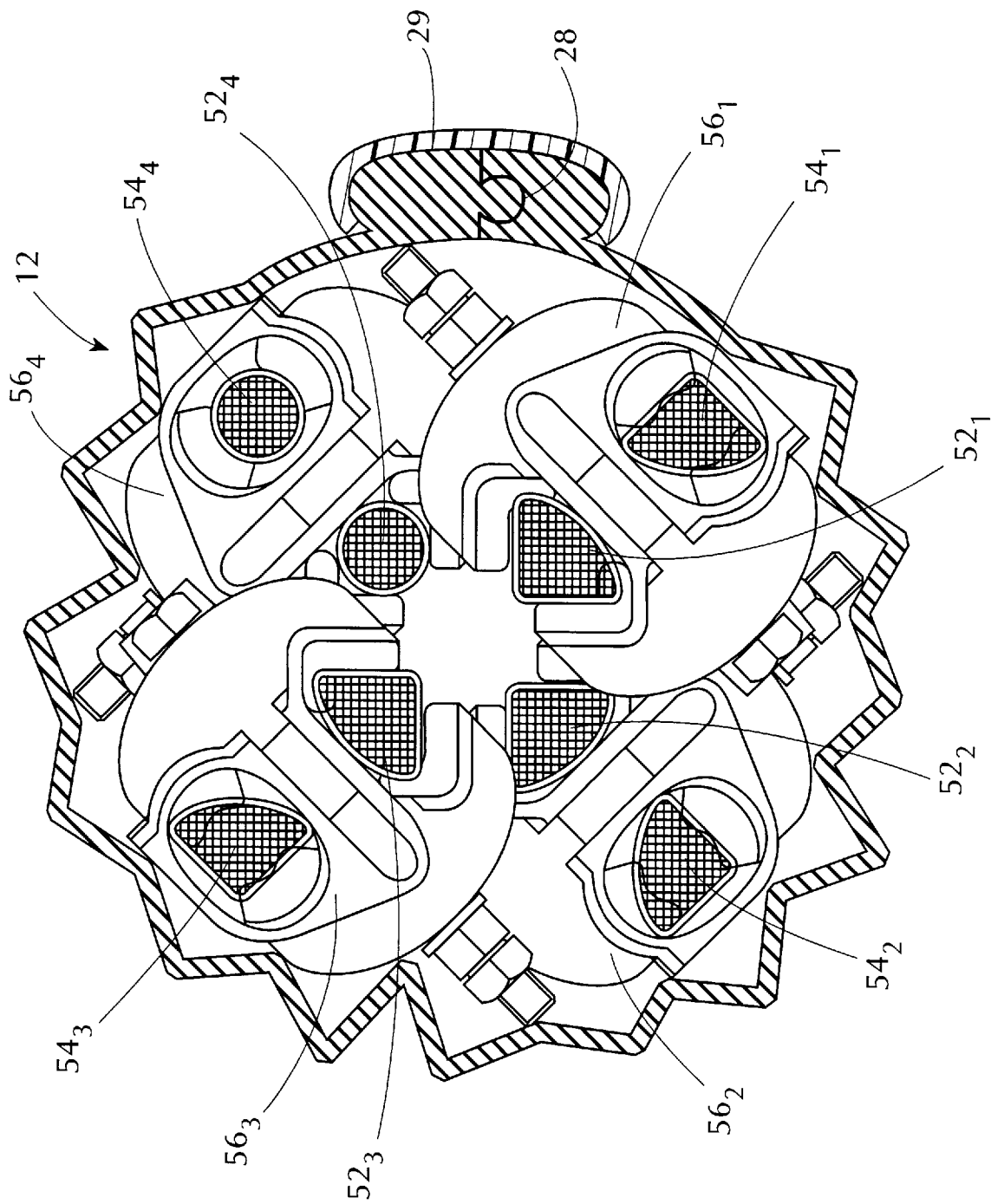
FIG. 5 is a cross-section along line V—V of FIG. 1 of the envelope of the accessory disposed about the cables and their physical interconnections.

FIG. 5 illustrates the positioning of the envelope once the accessory has been mounted.

As it is customary, in the case of a single branch connection, the three phases, $52_1$, $52_2$, $52_3$, as well as the neutral $52_4$, of the main cable are connected to the respective phases, $54_1$, $54_2$, $54_3$ and to the neutral $54_4$ of the branch cable, via connectors $56_1$, $56_2$, $56_3$ and $56_4$. Given its elastic nature, envelope 12 mates optimally with the outer contours of the physical interconnections as a whole, in such a way as to permit a maximum reduction of the volume of residual air and, as a result, the overall dimensions of the accessory.

The invention is not limited to the examples described, and various modifications may be made thereto without thereby departing from its scope.

We claim:

1. Accessory for connecting a plurality of conductors of low voltage power cables at a connection area comprising two lateral areas in which the conductors are sheathed, and an intermediate physical interconnection area, characterized in that said accessory includes:

a pair of rigid flanges (14) disposed in the region of each of said lateral areas and each of said flanges provided with at least a housing (16) permitting passage of said sheathed conductors;

a tight elastic envelope (12) covering the intermediate area and sealingly fixed at its two lateral areas (24) to each of the flanges (14), said envelope having transverse folds intermediate each of said flanges and said intermediate area.

2. Accessory according to claim 1, characterized in that the envelope (12) is a sheet bending back on itself and closed at its longitudinal ends (26) via a tenon and mortise joint (28).

3. Accessory according to claim 2, characterized in that the longitudinal ends (26) of the envelope (12) have flattened portions (30) provided with holes (32) to allow through fixing means, a double grooved joint (34) being provided on one of the flattened portions (30).

4. Accessory for connecting a plurality of conductors of low voltage power cables, disposed about a connection area comprising two lateral areas in which the conductors are sheathed, and an intermediate physical interconnection area, characterized in that said accessory includes:

a pair of rigid flanges (14) disposed in the region of each of said lateral areas and each of said flanges being provided with at least a housing (16) permitting passage of said sheathed conductors;

a tight elastic envelope (12) covering the intermediate area and sealingly fixed at its two lateral ends (24) to each of the flanges (14), said envelope having at least one positioning finger member (46) cooperating with a flexible tab (48) provided with a hole (50).

5. An enclosing accessory for enclosing the conductors of at least two low voltage power cables which are interconnected at a physical interconnection area and have two lateral areas at opposite sides of the interconnection area in which the conductors are sheathed, said accessory including:

a pair of rigid flanges, one of said flanges being positionable at one of said lateral areas and having at least one opening therethrough for the passage of a sheathed conductor of one of said cables and having sealing means at said opening sealingly engageable with the sheath of said sheathed conductor, the other of said flanges being positionable at the other of said lateral areas and having at least one opening therethrough for the passage of a sheathed conductor of the other of said cables and having sealing means at the opening in the other of said flanges sealingly engageable with the sheath of the sheathed conductor of the other of said cables;

an elastic envelope for encircling and covering said physical interconnection area and for engaging the conductors of said power cables in said interconnection area, said envelope having a first lateral end with sealing means for sealing engagement with said one of said flanges and a second lateral end with sealing means for sealing engagement with said other of said flanges;

whereby upon assembly of said flanges and said envelope with said cables, said flanges and said envelope form a sealed enclosure around said physical interconnection area and said lateral areas.

6. An accessory according to claim 5, wherein said envelope has longitudinal folds extending from a first point spaced from said first lateral end to a second point spaced from said second lateral end so as to overlie said physical interconnection area.

7. A method for providing a sealed enclosure around a physical interconnection area of first and second power cables, each of said cables having conductors with a sheath, said method comprising:

providing first and second rigid flanges, said first flange having openings therethrough corresponding in number to the number of said conductors of said first cable for the passage of said conductors of said first cable therethrough and each of said openings of said first flange having sealing means for engaging said sheath of said first cable and for providing a seal between said sheath of said first cable and said first flange and said second flange having openings therethrough corresponding in number to the number of said conductors of said second cable for the passage of said conductors of said second cable therethrough, each of said openings of said second flange having sealing means for engaging said sheath of said second cable and for providing a seal between said sheath of said second cable and said second flange;

positioning said first flange on said first cable with the conductors of the first cable extending through said openings on said first flange and at one side of said physical interconnection area;

positioning said second flange on said second cable with the conductors of said second cable extending through said openings in said second flange and at the other side of said physical interconnection area;

providing an elastic sheet having longitudinal edges and lateral edges, said lateral edges having sealing means for sealing engagement with respective ones of said first and second flanges; and wrapping said sheet around said physical interconnection area and in contact with said conductors, securing the longitudinal edges together in sealing relation, and securing one of said lateral edges of said sheet to said first flange in sealing relation and the other of said lateral edges of said sheet to said second flange in sealing relation.

8. Accessory for connecting a plurality of conductors of low voltage power cables at a connection area comprising two lateral areas spaced in the longitudinal direction from each other and in which the conductors are sheathed, and an intermediate physical interconnection area, characterized in that said accessory includes:

a pair of rigid flanges (14) disposed in the region of each of said lateral areas, each of said flanges being provided with at least a housing (16) permitting passage of said sheathed conductors and at least one of said flanges (22) having a circumferential outer surface portion (44), said outer surface portion (44) being substantially rectilinearly flat in a longitudinal cross-section;

a tight elastic envelope (12) covering the intermediate area and sealingly fixed at its two lateral areas (24) to each of the flanges (14), said envelope having a lateral inner surface portion (42) with at least one circumferentially extending projection (40) extending inwardly from said lateral inner surface portion (42) of said envelope; and clamping means (14) for pressing said inner surface portion (42) against said outer surface (44) of said one of said flanges whereby said projection is compressed by said clamping means.

\* \* \* \* \*